US012689141B2

(12) United States Patent
Arai

(10) Patent No.: US 12,689,141 B2
(45) Date of Patent: Jul. 21, 2026

(54) TERMINAL CONNECTION PORTION OF ELECTRONIC DEVICE

(71) Applicant: NHK SPRING CO., LTD., Yokohama (JP)

(72) Inventor: Mikio Arai, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 382 days.

(21) Appl. No.: 18/419,178

(22) Filed: Jan. 22, 2024

(65) Prior Publication Data

US 2024/0291184 A1 Aug. 29, 2024

(30) Foreign Application Priority Data

Feb. 27, 2023 (JP) ................................. 2023-028482

(51) Int. Cl.

| | |
|---|---|
| ***H01R 12/79*** | (2011.01) |
| ***H01R 4/02*** | (2006.01) |
| ***H01R 12/62*** | (2011.01) |
| ***H01R 12/65*** | (2011.01) |

(52) U.S. Cl.

CPC ............. *H01R 12/62* (2013.01); *H01R 4/023* (2013.01); *H01R 12/65* (2013.01); *H01R 2201/06* (2013.01)

(58) Field of Classification Search

CPC ........ H01R 12/62; H01R 4/023; H01R 12/65; H01R 2201/06; H01R 4/02; G11B 33/122

See application file for complete search history.

(56) References Cited

U.S. PATENT DOCUMENTS

| | | | | |
|---|---|---|---|---|
| 3,602,870 A * | 8/1971 | Willard | .................. | H01R 12/62 439/74 |
| 5,217,394 A * | 6/1993 | Ho | ..................... | H01R 13/6658 439/620.21 |
| 5,343,344 A * | 8/1994 | Nagase | .................. | G11B 21/00 |
| 6,957,963 B2 * | 10/2005 | Rathbum | ........... | H01R 13/2414 439/85 |
| 8,467,153 B1 | 6/2013 | Pan et al. | | |
| 8,605,390 B2 | 12/2013 | Kikuchi et al. | | |
| 2002/0163993 A1 * | 11/2002 | Hoffman | ............... | G01T 1/2985 378/19 |

(Continued)

FOREIGN PATENT DOCUMENTS

JP 5075970 B2 11/2012

*Primary Examiner* — Abdullah A Riyami
*Assistant Examiner* — Nelson R. Burgos-Guntin
(74) *Attorney, Agent, or Firm* — Holtz, Holtz & Volek PC

(57) ABSTRACT

A first bent portion and a second bent portion are provided in a first circuit member. The first bent potion includes a vertical portion and a lateral portion. The second bent portion is bent on a side opposite to the first bent potion. A first terminal is provided in the first bent potion. A second terminal is provided in the second bent potion. A protrusion portion is inserted into an opening. A first board side terminal is provided on a first surface of the second circuit member. A second board side terminal is provided on a second surface. The first terminal and the first board side terminal are connected to each other by a first conductive member. The second terminal and the second board side terminal are connected to each other by a second conductive member.

10 Claims, 7 Drawing Sheets

(56) References Cited

U.S. PATENT DOCUMENTS

| | | | | |
|---|---|---|---|---|
| 2008/0009179 | A1* | 1/2008 | Tadokoro | H01R 12/675 439/493 |
| 2008/0220626 | A1* | 9/2008 | Yeh | H01R 12/62 439/67 |
| 2016/0294079 | A1* | 10/2016 | Heine | H01R 12/52 |
| 2017/0271799 | A1* | 9/2017 | Axelowitz | H05K 3/363 |
| 2021/0267045 | A1* | 8/2021 | Takada | H05K 1/028 |
| 2021/0273361 | A1* | 9/2021 | Nagai | H05K 1/0233 |

* cited by examiner

TERMINAL CONNECTION PORTION OF ELECTRONIC DEVICE

CROSS-REFERENCE TO RELATED APPLICATIONS

This application is based upon and claims the benefit of priority from prior Japanese Patent Application No. 2023-028482, filed Feb. 27, 2023, the entire contents of which are incorporated herein by reference.

BACKGROUND OF THE INVENTION

1. Field of the Invention

The present invention relates to a terminal connection portion which is suitable for connecting, for example, the first and second circuit members of an electronic device such as a hard disk drive to each other.

2. Description of the Related Art

Hard disk drives (hereinafter, simply referred to as disk drives) are used for information processing devices such as personal computers. Each disk drive includes a magnetic disk which rotates around a spindle, a carriage which pivots on a pivot, etc. The carriage comprises a plurality of arm portions and pivots on the pivot by a positioning motor.

A disk drive suspension (hereinafter, referred to as a suspension) is attached to each of the arm potions. The suspension includes a load beam, a flexure provided along the load beam, etc. A slider is mounted in the vicinity of the distal end of the flexure. An element for performing access such as data read or write is provided in the slider.

The flexure includes a metal base, a base insulating layer, a plurality of conductors, a cover layer and the like. The metal base consists of a thin stainless steel plate. The base insulating layer is formed on the metal base. The conductors are formed on the base insulating layer. The cover layer covers the conductors. An end side of each conductor is connected to the element of the slider and various functional components. The other end side of each conductor is connected to an electronic device such as a preamplifier via a terminal connection portion. The base insulating layer and the cover layer are formed of electrically insulating resin such as polyimide. A wiring portion of the flexure consists of the base insulating layer, the conductors, the cover layer, etc.

The flexure described in U.S. Pat. No. 8,467,153 B (Patent Literature 1) comprises a flexure body portion along a load beam and a flexure tail which extends to the rear side of the load beam. A tail pad portion is formed in an end portion of the flexure tail.

A plurality of terminals called tail terminals are provided in the tail pad portion. The tail terminals are provided at intervals in the length direction of the tail pad portion. These tail terminals are electrically connected to the conductors of the wiring portion, respectively. Terminals provided in a circuit board such as a preamplifier are connected to these tail terminals via conductive members such as solder.

To correspond to the increase in the density of data, the number of disks incorporated into one disk drive tends to increase. Accordingly, the number of suspensions used in one disk drive also increases. In addition, as the suspensions increase their features, the number of conductors of the wiring portion of the flexure also increases. Thus, the number of tail terminals also increase.

When the number of tail terminals is increased, the tail pad portion becomes longer. However, as the space inside the disk drive is limited, the length of the tail pad portion is restricted. Thus, it is difficult to provide a large number of tail terminals in the tail pad portion depending on the specification of the disk drive.

If the size of each tail terminal is reduced, more tail terminals can be provided in the tail pad portion. However, the connection of the small tail terminals to the terminals of the circuit board via a conductive member such as solder is difficult. Further, when the distance between terminals which are adjacent to each other is decreased, it is difficult to prevent an electric short circuit.

The tail pad portion described in JP 5075970 B (Patent Literature 2) comprises a plurality of terminals provided in each of a side portion and the other side portion. However, when the tail pad portion is narrow, the distance between the terminals is short. Thus, it is difficult to assure an electrically insulating distance.

An embodiment of the present invention aims to provide a terminal connection portion for connecting first and second circuit members comprising a plurality of terminals to each other so as to prevent the increase in the length of the terminal connection portion and avoid a short circuit between the terminals in the terminal connection portion.

BRIEF SUMMARY OF THE INVENTION

According to an embodiment, a terminal connection portion comprises a first circuit member and a second circuit member. The first circuit member comprises a first face and a second face, and comprises first and second conductors provided on the first face. A first bend portion which is bent in a thickness direction of the first circuit member and a second bent portion which is bent in a direction opposite to the first bent portion are provided in part of the first circuit member. A first terminal is provided in the first bent portion. The first terminal is electrically connected to the first conductor. A second terminal is provided in the second bent portion. The second terminal is electrically connected to the second conductor.

The second circuit member comprises an electrically insulating board. The board comprises a first surface and a second surface. A first board side terminal is provided at a position corresponding to the first terminal on the first surface. A second board side terminal is provided at a position corresponding to the second terminal on the second surface. The first terminal and the first board side terminal are connected to each other by a first conductive member. The second terminal and the second board side terminal are connected to each other by a second conductive member.

According to the embodiment, the first terminal provided in the first bent portion of the first circuit member and the first board side terminal provided on the first surface of the second circuit member can be connected to each other. The second terminal provided in the second bent portion of the first circuit member and the second board side terminal provided on the second surface of the second circuit member can be connected to each other.

An example of the first bent portion comprises a vertical portion which is bent in the thickness direction of the first circuit member, and a lateral portion which extends from the vertical portion in a direction parallel to the first face. An opening is formed between the lateral portion and the second bent portion. A protrusion portion may be formed in the second circuit member. The protrusion portion is inserted into the opening. The first board side terminal and the second board side terminal are provided in the protrusion portion.

The first circuit member may comprise a metal base, and the base insulating layer overlapping the metal base. The first bent portion may include part of the metal base, part of the base insulating layer, and the first terminal. The second bent portion may include part of the metal base, part of the base insulating layer, and the second terminal. An example of the first bent portion is bent toward the first face side of the first circuit member. The second bent portion is bent toward the second face side of the first circuit member.

The first circuit member is, for example, a tail pad portion of a flexure of a suspension for a disk drive. An example of the second circuit member is a circuit board of the disk drive. An example of the first conductive member is a solder bump attached to the first terminal. An example of the second conductive member is a solder bump attached to the second terminal. Another example of the first conductive member may be a solder bump attached to the first board side terminal. Another example of the second conductive member may be a solder bump attached to the second board side terminal.

The first circuit member may comprise a metal base, and a base insulating layer overlapping the metal base. A terminal portion which consists of only the first terminal may be provided in the first bent portion. A terminal portion which consists of only the second terminal may be provided in the second bent portion. The first bent portion may be bent toward the second face side of the first circuit member. The second bent portion may be vent toward the first face side of the first circuit member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

This specification hereinafter explains the terminal connection portion of an electronic device according to an embodiment, referring to FIG. 1 to FIG. 7.

Figure 1:
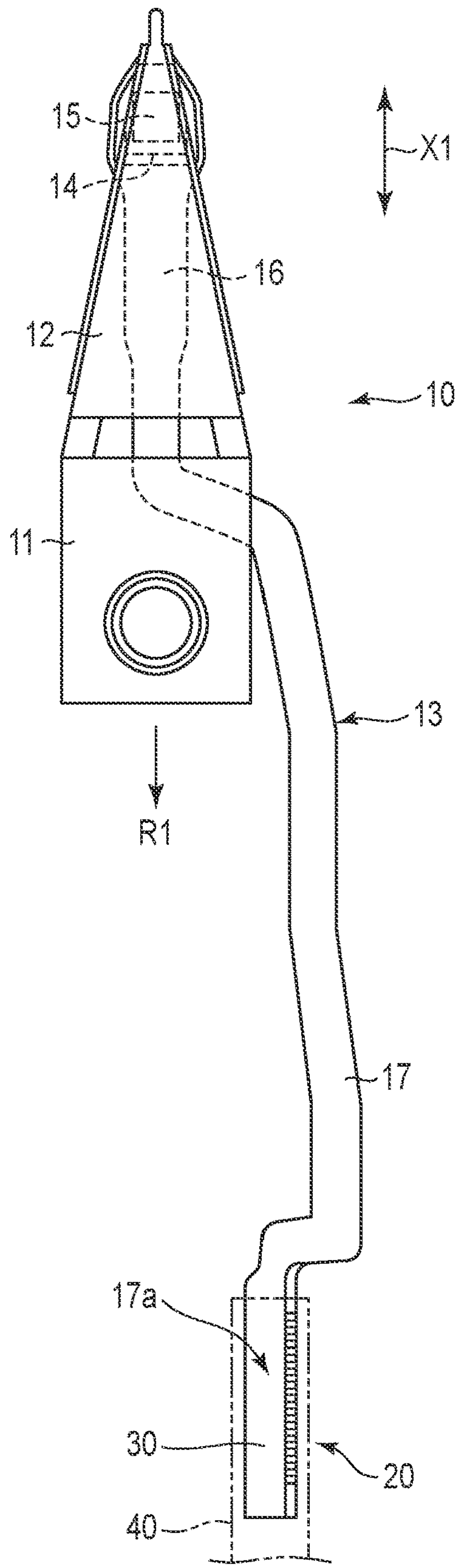
FIG. 1 is a plan view showing an example of a disk drive suspension.

FIG. 1 is a plan view showing an example of a suspension 10 used for a hard disk drive. The suspension 10 includes a base plate 11, a load beam 12, a flexure 13, a slider 15 provided in the tongue portion 14 of the flexure 13, etc.

The load beam 12 consists of a stainless steel plate and extends in the length direction of the suspension 10. The two-headed arrow X1 shown in FIG. 1 indicates the longitudinal direction of the load beam 12, that is, the longitudinal direction of the suspension 10. The thickness of the load beam 12 is, for example, 20 to 40 μm. However, the thickness may be different from this example.

The flexure 13 includes a flexure body portion 16 and a flexure tail 17. The flexure body portion 16 is secured to the load beam 12. The flexure tail 17 extends from the flexure body portion 16 to the rear side of the base plate 11 (in the direction shown by arrow R1 in FIG. 1). A tail pad portion 17*a* is formed in an end portion of the flexure tail 17. The tail pad portion 17*a* is part of the flexure tail 17 and forms part of a terminal connection portion 20.

In this specification, the tail pad portion 17*a* is called a first circuit member 30 in some cases. The first circuit member 30 is connected to a second circuit member 40 via the terminal connection portion 20. The second circuit member 40 is, for example, a circuit board on the amplifier side. For example, the second circuit member 40 consists of a flexible printed circuit board. The terminal connection portion 20 is formed in a portion in which the first circuit member 30 overlaps the second circuit member 40.

Figure 2:
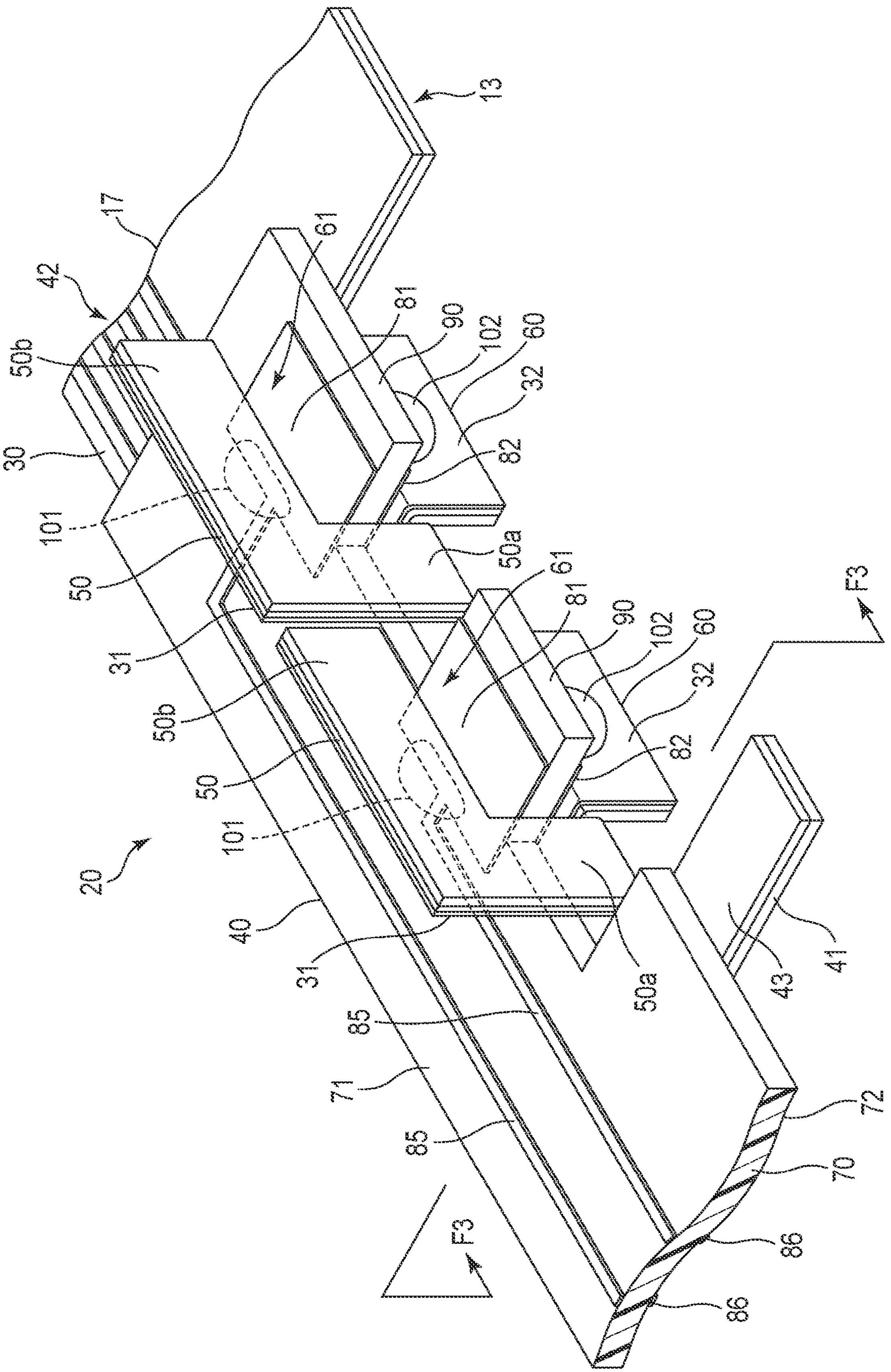
FIG. 2 is a perspective view in which part of a terminal connection portion is enlarged according to a first embodiment.
Figure 3:
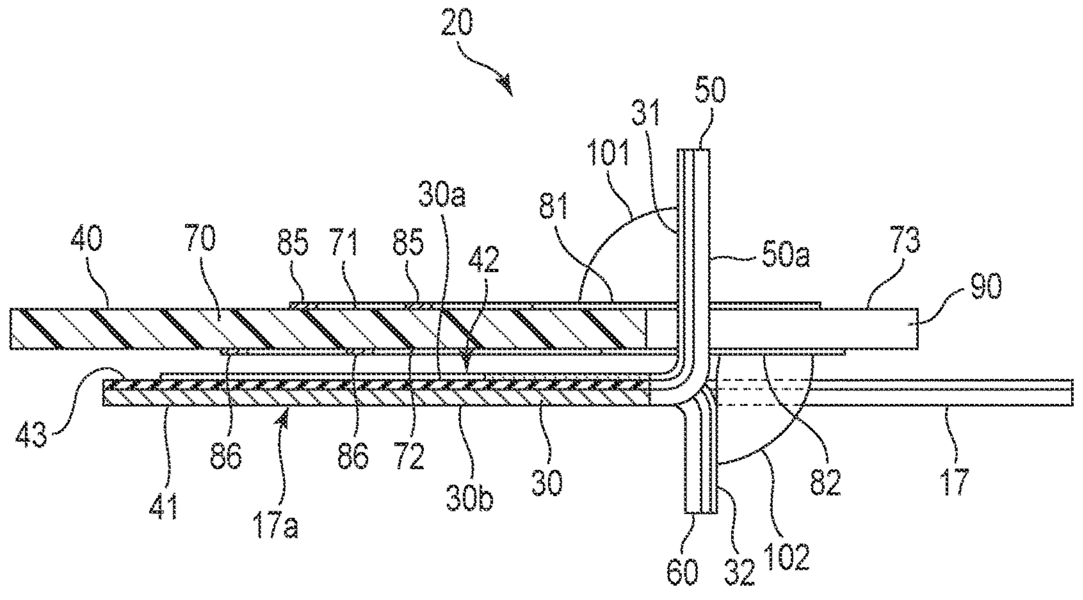
FIG. 3 is a cross-sectional view of the terminal connection portion along the F3-F3 line of FIG. 2.
Figure 4:
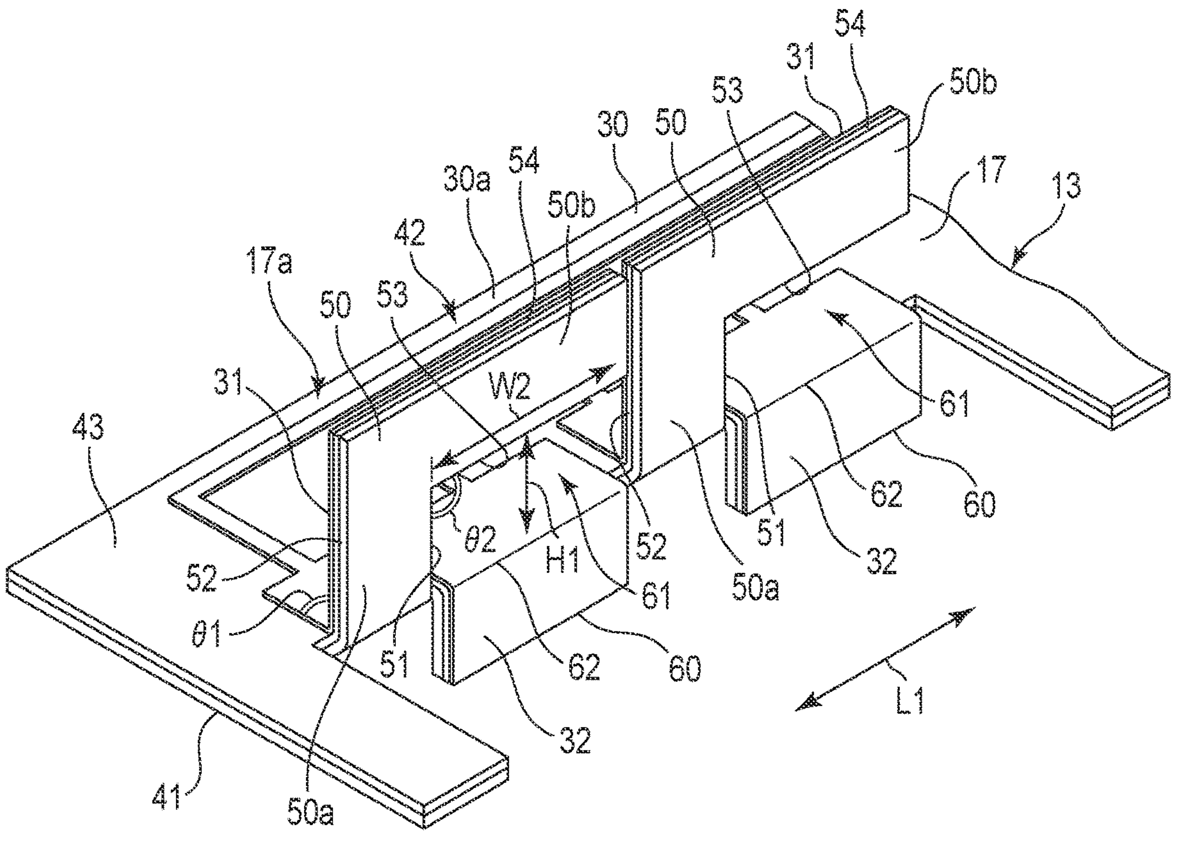
FIG. 4 is a perspective view of part of the first circuit member of the terminal connection portion shown in FIG. 2.
Figure 5:
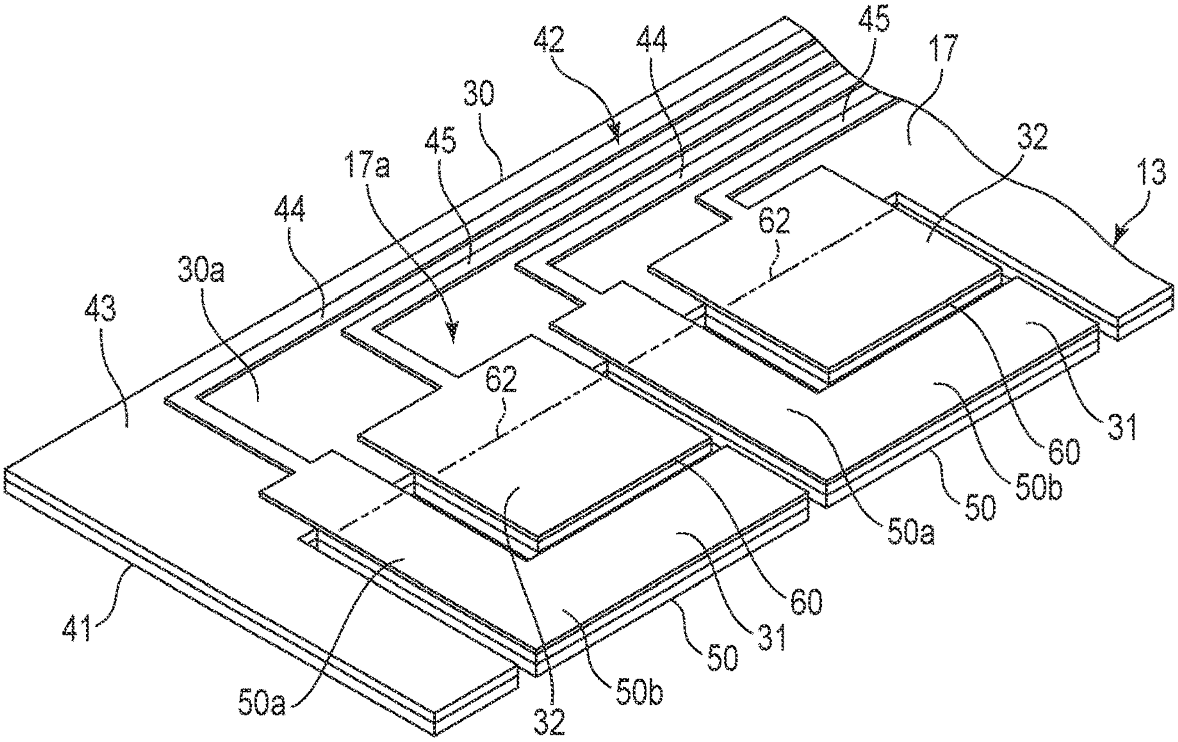
FIG. 5 is a perspective view of the first circuit member before the first and second bent portions of the first circuit member shown in FIG. 4 are bent.

FIG. 2 is a perspective view in which part of the terminal connection portion 20 is enlarged according to the first embodiment. FIG. 3 is a cross-sectional view of the terminal connection portion 20 along the F3-F3 line of FIG. 2. FIG. 4 shows part of the first circuit member 30. As shown in FIG. 3, the first circuit member 30 comprises a first face 30*a* and a second face 30*b* such that these faces are parallel to each other. As shown in FIG. 5, a plurality of first terminals 31 and a plurality of second terminals 32 are alternately provided on the first face 30*a*. For convenience sake, each of FIG. 2, FIG. 4 and FIG. 5 schematically shows the terminal connection portion 20 comprising two first terminals 31 and two second terminals 32.

As shown in FIG. 2 to FIG. 5, the first circuit member 30 which is part of the flexure 13 includes a metal base 41 and a wiring portion 42. The metal base 41 consists of a thin stainless steel plate. For example, the thickness of the metal base 41 is 20 μm (12 to 25 μm) and is less than that of the load beam 12. The wiring portion 42 is provided along the metal base 41.

The wiring portion 42 includes a base insulating layer 43, a plurality of conductors 44 and 45 (only partly shown) and a cover layer which covers the conductors 44 and 45. The base insulating layer 43 is formed of electrically insulating resin such as polyimide. The conductors 44 and 45 are formed on the base insulating layer 43. The cover layer is formed of electrically insulating resin such as polyimide. To avoid complicating the drawings, the cover layer is not shown. The conductors 44 and 45 are provided on the first face 30*a* of the first circuit member 30.

The first circuit member 30 comprises a plurality of first bent portions 50 and a plurality of second bent portions 60. The first bent portions 50 and the second bent portions 60 are alternately provided at a predetermined pitch in the length direction of the first circuit member 30 (as shown by L1 in FIG. 4). As the first bent portions 50 have a common configuration, hereinafter, one first bent portion 50 is explained as a representative. As the second bent portions 60 also have a common configuration, hereinafter, one second bent portion 60 is explained as a representative.

The first bent portion 50 is part of the first circuit member 30 and is provided in a side portion of the first circuit member 30. The first bent portion 50 is bent in the thickness direction of the first circuit member 30 at angle θ1 (FIG. 4) relative to the first face 30*a*. Angle θ1 is an angle close to 90°. However, angle θ1 may be an angle other than 90°. The first bent portion 50 includes part of the metal base 41 and part of the base insulating layer 43. The first terminal 31 is provided in the first bent portion 50.

The first bent portion 50 comprises a vertical portion 50*a* and a lateral portion 50*b*. The vertical portion 50*a* is bent in the thickness direction of the first circuit member 30 at angle θ1 (FIG. 4) relative to the first face 30*a* of the first circuit member 30. The lateral portion 50*b* extends from the distal end of the vertical portion 50*a* in the length direction of the first circuit member 30 (as shown by L1 in FIG. 4) along the first face 30*a*. The first bent portion 50 has substantially an L-shape.

The vertical portion 50*a* comprises a pair of side surfaces 51 and 52. The side surfaces 51 and 52 extend in the thickness direction of the first circuit member 30. The lateral portion 50*b* comprises a pair of side surfaces 53 and 54. The side surfaces 53 and 54 are parallel to the first face 30*a* of the first circuit member 30. As shown in FIG. 4, an opening 61 is formed between the first and second bent portions 50 and 60 which form a pair. The opening 61 is defined by the side surface 51 of the vertical portion 50*a*, the side surface 53 of the lateral portion 50*b*, and the folding edge 62 (FIG. 4) of the second bent portion 60.

The second bent portion 60 is provided in the first circuit member 30. The second bent portion 60 is formed in the side portion of the first circuit member 30. The second bent portion 60 is bent at an angle close to 90° toward the second face 30*b*. In other words, the second bent portion 60 is bent on a side opposite to the first bent portion 50 regarding the thickness direction of the first circuit member 30. However, the second bent portion 60 may be bent at an angle other than 90°. The second bent portion 60 includes part of the metal base 41 and part of the base insulating layer 43. The second terminal 32 is provided in the second bent portion 60.

FIG. 5 shows the first circuit member 30 before the first bent portion 50 and the second bent portion 60 are bent. Before they are bent, the first circuit member 30 has the shape of substantially a flat plate. The base insulating layer 43 is stacked on the metal base 41. The first terminal 31 and the second terminal 32 are alternately formed in the length direction of the first circuit member 30 on the base insulating layer 43. The first conductor 44 is connected to the first terminal 31. The second conductor 45 is connected to the second terminal 32. These conductors 44 and 45 are covered with a cover insulating layer. However, to avoid complicating the drawings, the cover insulating layer is not shown. A gold-plating layer may be formed on the surface of each of the first terminal 31 and the second terminal 32.

Figure 6:
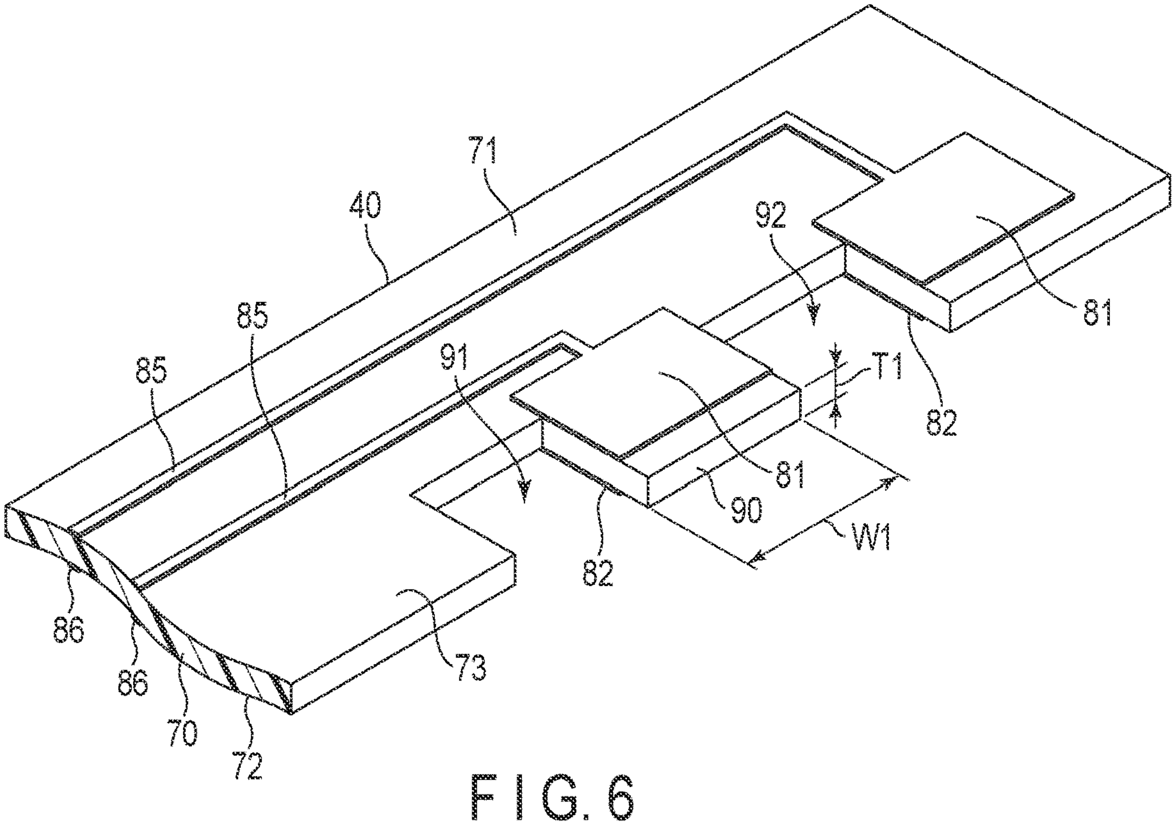
FIG. 6 is a perspective view of part of the second circuit member of the terminal connection portion shown in FIG. 2.

FIG. 6 shows part of the second circuit member 40. For example, the second circuit member 40 is a flexible printed circuit board. The second circuit member 40 comprises a board 70 formed of electrically insulating resin. The board 70 comprises a first surface 71, a second surface 72 and a side portion 73. The second surface 72 is a surface opposite to the first surface 71. The first surface 71 and the second surface 72 are substantially parallel to each other. In this specification, for convenience sake, the first surface 71 is called an obverse side, and the second surface 72 is called a reverse side, in some cases.

The second circuit member 40 comprises a first board side terminal 81 and a second board side terminal 82. The first board side terminal 81 is provided on the first surface 71 which is the obverse side. The second board side terminal 82 is provided on the second surface 72 which is the reverse side. The first board side terminal 81 is electrically connected to a conductor 85. The second board side terminal 82 is electrically connected to the other conductor 86. Each of the conductors 85 and 86 is covered with a cover insulating layer. However, to avoid complicating the drawings, the cover insulating layers are omitted. A gold plate may be provided on the surface of each of the first board side terminal 81 and the second board side terminal 82.

As shown in FIG. 6, a protrusion portion 90 and recess portions 91 and 92 are formed in the side portion 73 of the second circuit member 40. The protrusion portion 90 is formed between the recess portions 91 and 92. Width W1 of the protrusion portion 90 is less than width W2 (FIG. 4) of the opening 61 of the first circuit member 30. Thickness T1 (FIG. 6) of the protrusion portion 90 is less than height H1 (FIG. 4) of the opening 61. Thus, the protrusion portion 90 can be inserted into the opening 61.

The first board side terminal 81 is provided at the position where the protrusion portion 90 is provided on the first surface 71 of the second circuit member 40. The first board side terminal 81 is provided at a position corresponding to the first terminal 31 of the first circuit member 30. The second board side terminal 82 is provided at the position where the protrusion portion 90 is provided on the second surface 72 of the second circuit member 40. The second board side terminal 82 is provided at a position corresponding to the second terminal 32 of the first circuit member 30. The first board side terminal 81 and the second board side terminal 82 are connected to an electronic circuit such as a preamplifier via the conductors 85 and 86, respectively.

As shown in FIG. 2, the protrusion portion 90 of the second circuit member 40 is inserted into the opening 61 of the first circuit member 30. Thus, the first terminal 31 and the first board side terminal 81 are electrically connected to each other by a first conductive member 101. The second terminal 32 and the second board side terminal 82 are electrically connected to each other by a second conductive member 102. For example, the first conductive member 101 and the second conductive member 102 are solder.

As explained above, the terminal connection portion 20 of the embodiment comprises the first bent portion 50 provided in the first circuit member 30 and having an L-shape, and the second bent portion 60 which forms a pair with the first bent portion 50. The second bent portion 60 is bent in the opposite direction of the first bent portion 50. The opening 61 is formed between the first bent portion 50 and the second bent portion 60. The first terminal 31 and the first board side terminal 81 as a pair correspond to each other on the first surface 71. The second terminal 32 and the second board side terminal 82 as a pair correspond to each other on the second surface 72.

The first terminal 31 and the first board side terminal 81 as a pair are connected to each other by the first conductive member 101. The first conductive member 101 is supplied to the first surface 71 which is the obverse side. The second terminal 32 and the second board side terminal 82 as a pair are connected to each other by the second conductive member 102. The second conductive member 102 is supplied to the second surface 72 which is the reverse side. This configuration avoids an electric short circuit between the first conductive member 101 and the second conductive member 102.

Thus, the first terminal 31 and the first board side terminal 81 are connected to each other by the first conductive member 101 on the first surface 71 which is the obverse side. The second terminal 32 and the second board side terminal 82 are connected to each other by the second conductive member 102 on the second surface 72 which is the reverse side. By this configuration, the length of the terminal connection portion 20 comprising the terminals 31 and 32 and the board side terminals 81 and 82 can be reduced.

Figure 7:
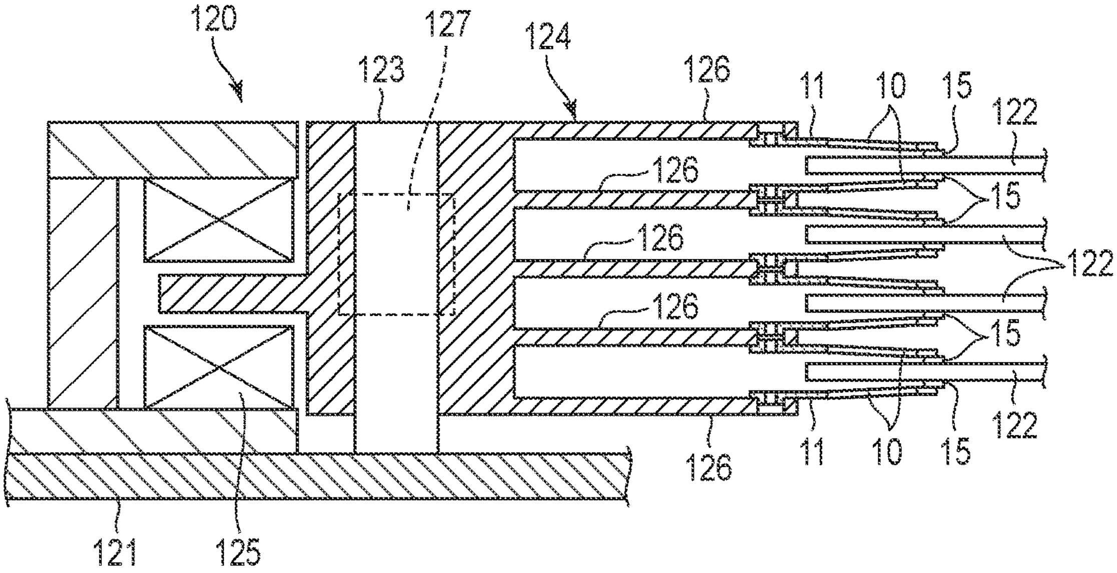
FIG. 7 is a cross-sectional view schematically showing an example of a disk drive.

FIG. 7 is a cross-sectional view schematically showing an example of a disk drive 120 comprising the suspensions 10. The disk drive 120 comprises a case 121 (only partly shown), a disk 122 which rotates around a spindle, a carriage 124 which pivots on a pivot 123, a positioning motor 125 which drives the carriage 124 and the like. The case 121 is sealed by a lid. The suspension 10 is attached to the distal end of each of the arm portions 126 of the carriage 124. A signal processing circuit 127 such as a preamplifier is accommodated in the case 121.

When the disk 122 rotates at high speed, an air bearing is formed between the slider 15 (FIG. 1 and FIG. 7) and the disk 122. When the carriage 124 is caused to pivot by the positioning motor 125, the suspension 10 moves in the radial direction of the disk 122. In this manner, the slider 15 moves to a desired position of the disk 122.

Second Embodiment

Figure 8:
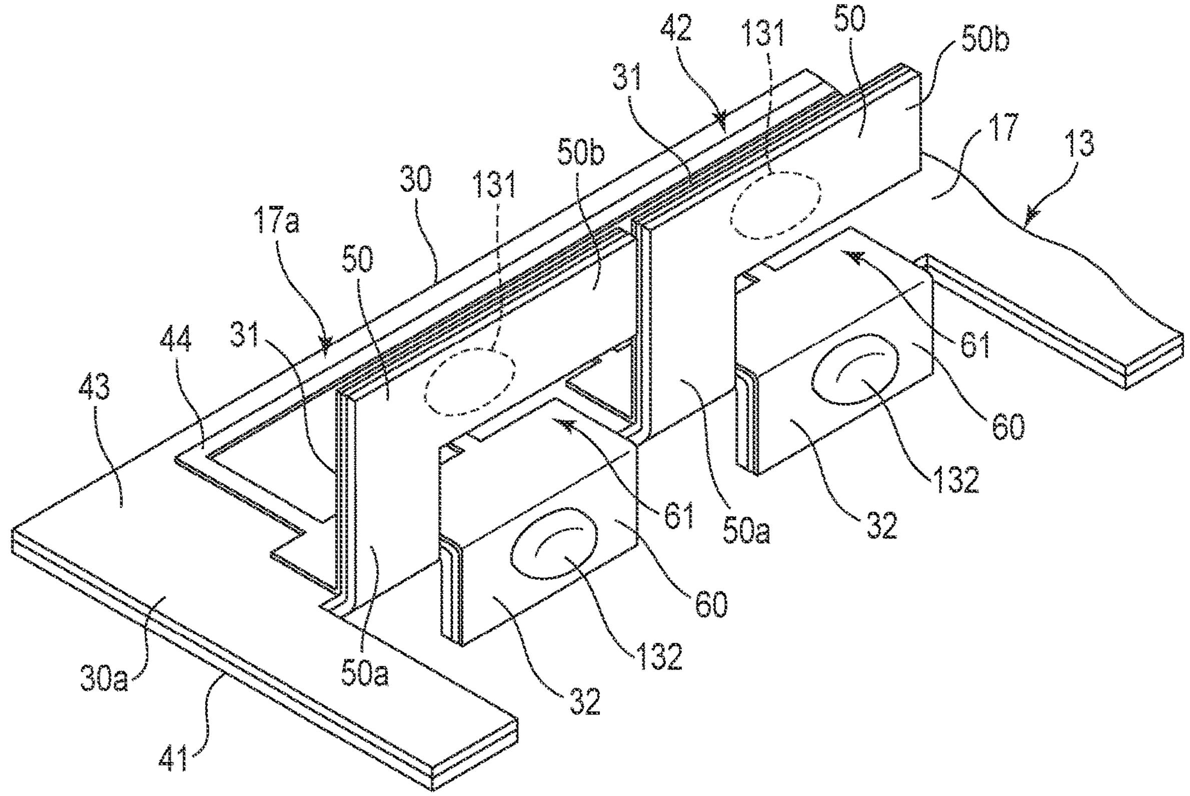
FIG. 8 is a perspective view of part of the first circuit member of a terminal connection portion according to a second embodiment.

FIG. 8 shows the first circuit member 30 of a terminal connection portion according to a second embodiment. In this embodiment, a solder bump 131 as a first conductive member is provided in a first bent portion 50. A solder bump 132 as a second conductive member is provided in a second bent portion 60.

By heating and melting the solder bumps 131 and 132, a first terminal 31 and a first board side terminal 81 (FIG. 2) are connected to each other by the solder bump 131. A second terminal 32 and a second board side terminal 82 (FIG. 2) are connected to each other by the solder bump 132. Regarding the other configurations and effects, the terminal connection portion of the second embodiment is similar to the terminal connection portion 20 (FIG. 2) of the first embodiment. Thus, common reference numbers are assigned to common structural elements, an explanation thereof being omitted.

Third Embodiment

Figure 9:
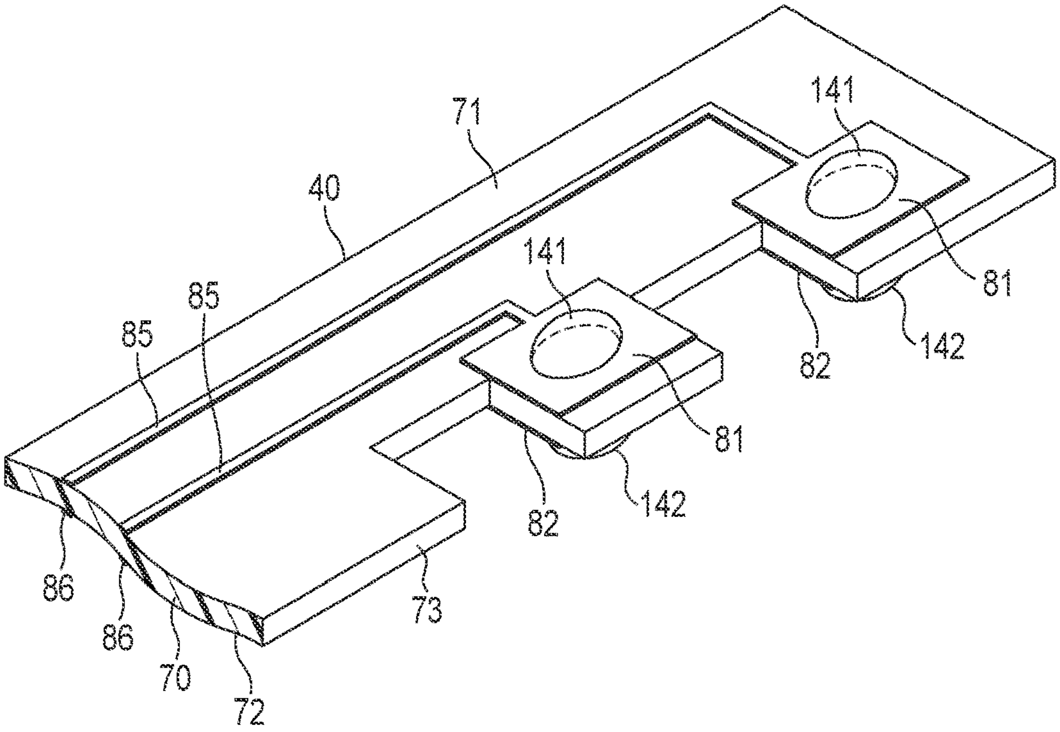
FIG. 9 is a perspective view of part of the second circuit member of a terminal connection portion according to a third embodiment.

FIG. 9 shows the second circuit member 40 of a terminal connection portion according to a third embodiment. In this embodiment, solder bumps 141 and 142 are provided in the first and second board side terminals 81 and 82 of the second circuit member 40, respectively. The other configurations and effects are common to the terminal connection portion of the third embodiment and the terminal connection portion 20 of the first embodiment. Thus, common reference numbers are assigned to common structural elements, an explanation thereof being omitted.

Fourth Embodiment

Figure 10:
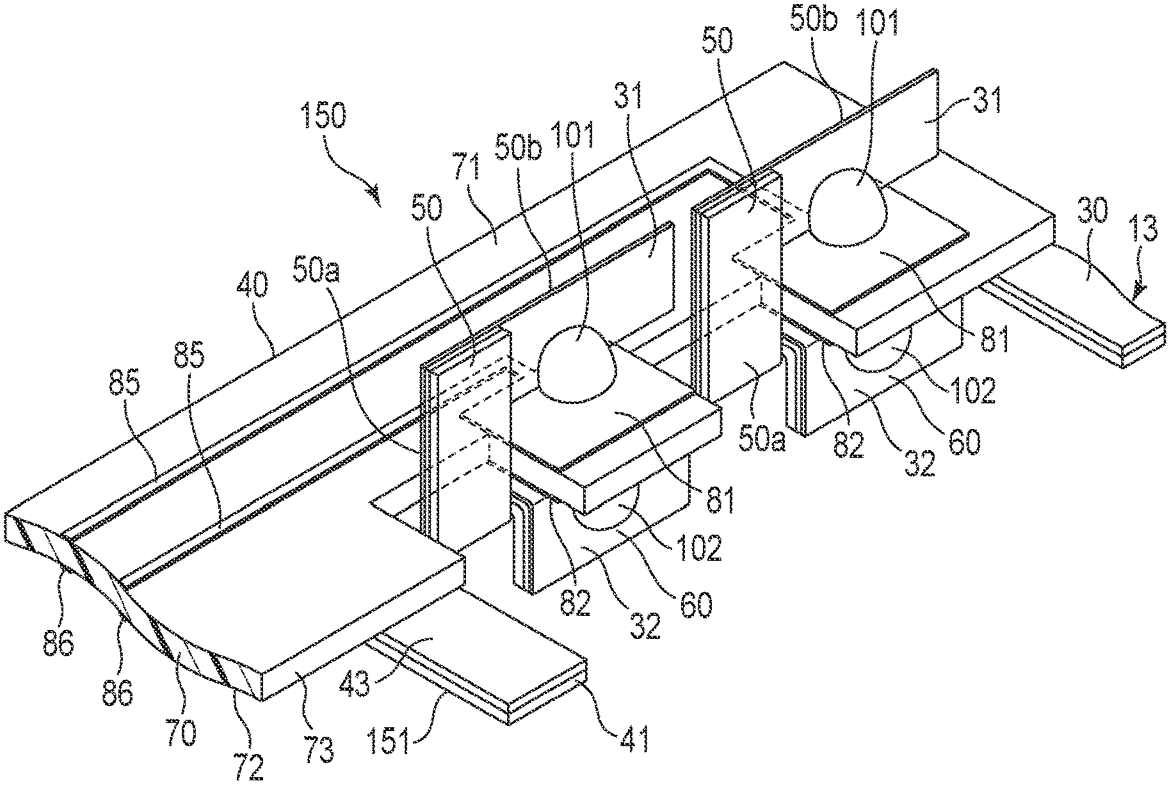
FIG. 10 is a perspective view showing part of a terminal connection portion according to a fourth embodiment.

FIG. 10 shows a terminal connection portion 150 according to a fourth embodiment. The first circuit member 30 of the terminal connection portion 150 comprises a terminal portion which consists of only a first terminal 31 formed in the lateral portion 50*b* of a first bent portion 50. This terminal portion does not include a metal base 41 or a base insulating layer 43. Thus, a first conductive member 101 for connecting the first terminal 31 and a first board side terminal 81 to each other can be provided on the same side as a second conductive member 102. The other configurations and effects are common to the terminal connection portion 150 of the fourth embodiment and the terminal connection portion 20 of the first embodiment. Thus, common reference numbers are assigned to common structural elements, an explanation thereof being omitted.

Fifth Embodiment

Figure 11:
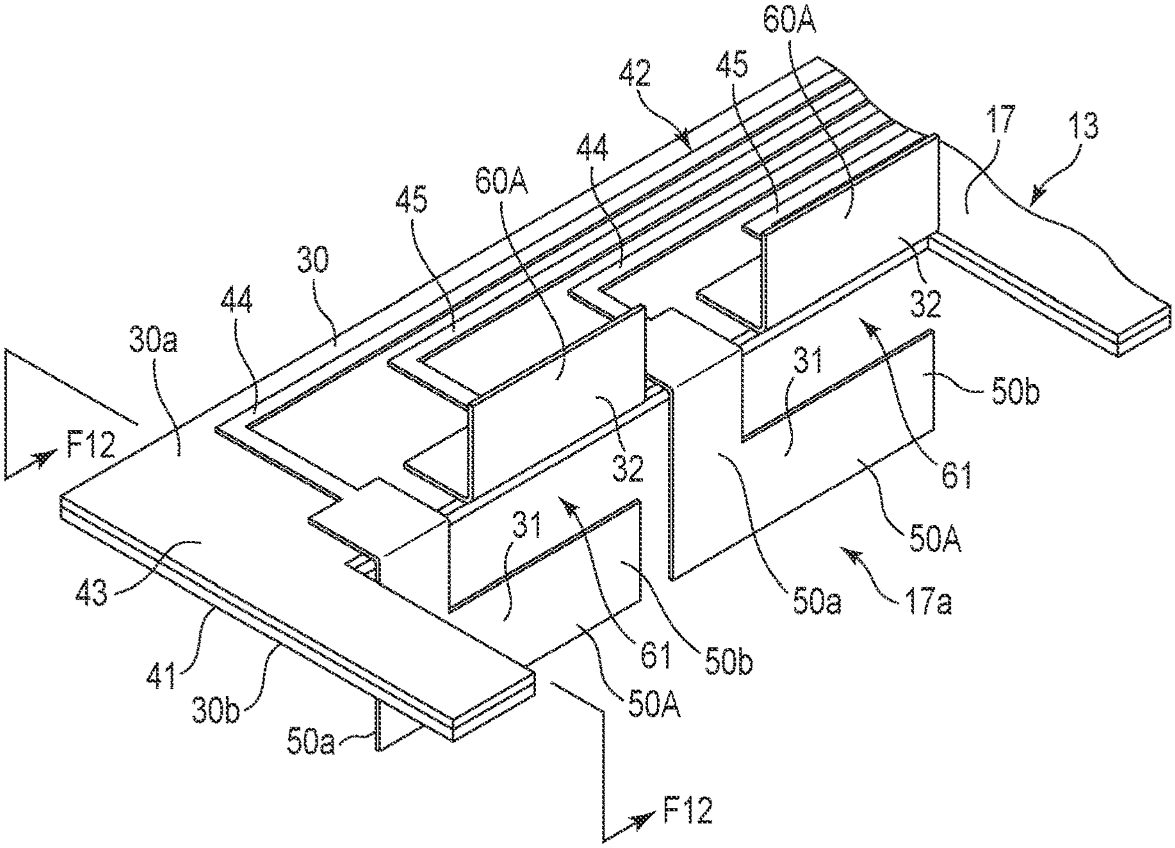
FIG. 11 is a perspective view of part of a first circuit member according to a fifth embodiment.
Figure 12:
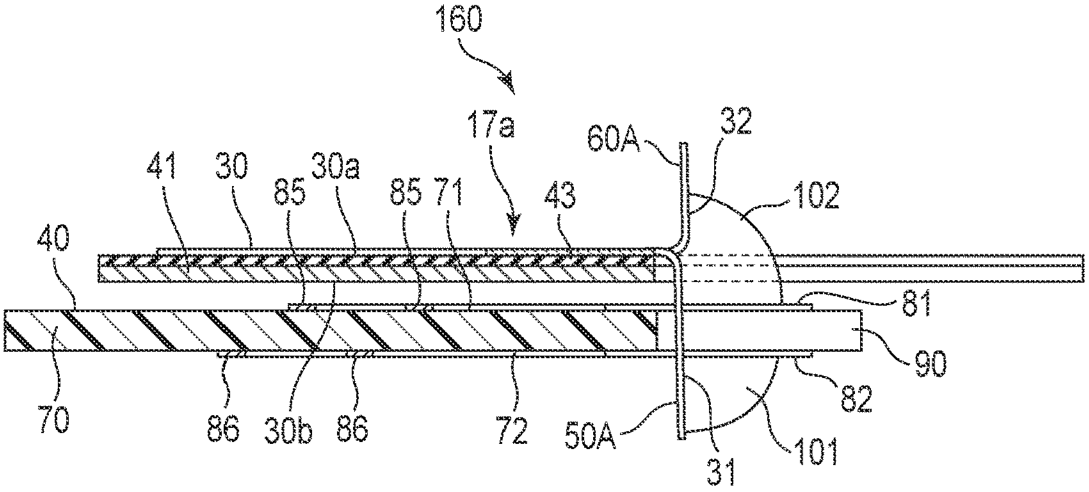
FIG. 12 is a cross-sectional view of the terminal connection portion comprising the first circuit member shown in FIG. 11 along the F12-F12 line of FIG. 11

FIG. 11 shows a first circuit member 30 according to a fifth embodiment. FIG. 12 is a cross-sectional view of a terminal connection portion 160 along the F12-F12 line of FIG. 11. The first circuit member 30 of this terminal connection portion 160 comprises a first bent portion 50A and a second bent portion 60A. The first bent portion 50A is bent toward the second face 30*b* side of the first circuit member 30. The second bent portion 60A is bent toward the first face 30*a* side of the first circuit member 30.

The first bent portion 50A comprises a terminal portion which consists of only a first terminal 31. The first terminal 31 and a board side terminal 82 are connected to each other by a first conductive member 101. The second bent portion 60A comprises a terminal portion which consists of only a second terminal 32. The second terminal 32 and a board side terminal 81 are connected to each other by a second conductive member 102.

According to the terminal connection portion 160 of the fifth embodiment, a second circuit member 40 can be provided on the second face 30*b* side of the first circuit member 30. The other configurations and effects are common to the terminal connection portion 160 of the fifth embodiment and the terminal connection portion 20 of the first embodiment. Thus, common reference numbers are assigned to common structural elements, an explanation thereof being omitted.

As a matter of course, the present invention can be implemented by changing the specific forms of the elements constituting the present invention in various ways, such as the specific forms of the first circuit member and the second circuit member, the shapes and positions of the first terminal and the second terminal, and the shapes and positions of the first board side terminal and the second board side terminal. The technical concept of the present invention may be applied to the terminal connection portion of an electronic device other than a disk drive.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A terminal connection portion of an electronic device, comprising:
- a first circuit member comprising a first face and a second face, and comprising a first conductor and a second conductor provided on the first face;
- a first bent portion which is part of the first circuit member and is bent in a thickness direction of the first circuit member;
- a second bent portion which is part of the first circuit member and is bent in an opposite direction of the first bent portion;
- a first terminal provided in the first bent portion and electrically connected to the first conductor;
- a second terminal provided in the second bent portion and electrically connected to the second conductor;
- a second circuit member comprising an electrically insulating board comprising a first surface and a second surface;
- a first board side terminal provided at a position corresponding to the first terminal of the first surface;
- a second board side terminal provided at a position corresponding to the second terminal of the second surface;
- a first conductive member which connects the first terminal and the first board side terminal to each other; and
- a second conductive member which connects the second terminal and the second board side terminal to each other.

2. The terminal connection portion of claim 1, wherein
- the first bent portion comprises a vertical portion which is bent in the thickness direction of the first circuit member, and a lateral portion which extends from the vertical portion in a direction parallel to the first face,
- an opening is formed between the lateral portion and the second bent potion,
- the second circuit member comprises a protrusion portion inserted into the opening, and
- the first board side terminal and the second board side terminal are provided in the protrusion portion.

3. The terminal connection portion of claim 1, wherein
- the first circuit member comprises a metal base, and a base insulating layer overlapping the metal base,
- the first bent portion includes part of the metal base, part of the base insulating layer, and the first terminal, and
- the second bent portion includes part of the metal base, part of the base insulating layer, and the second terminal.

4. The terminal connection portion of claim 1, wherein
- the first bent portion is bent toward the first face side of the first circuit member, and the second bent portion is bent toward the second face side.

5. The terminal connection portion of claim 1, wherein
- the first circuit member is a tail pad portion of a flexure of a suspension of a disk drive, and
- the second circuit member is a circuit board of the disk drive.

6. The terminal connection portion of claim 1, wherein
- the first conductive member is a solder bump attached to the first terminal, and the second conductive member is a solder bump attached to the second terminal.

7. The terminal connection portion of claim 1, wherein
- the first conductive member is a solder bump attached to the first board side terminal, and the second conductive member is a solder bump attached to the second board side terminal.

8. The terminal connection portion of claim 1, wherein
- the first circuit member comprises a metal base, and a base insulating layer overlapping the metal base, and
- a terminal portion which consists of only the first terminal is provided in the first bent portion.

9. The terminal connection portion of claim 1, wherein
- the first circuit member comprises a metal base, and a base insulating layer overlapping the metal base, and
- a terminal portion which consists of only the second terminal is provided in the second bent portion.

10. The terminal connection portion of claim 9, wherein
- the first bent portion is bent toward the second face side of the first circuit member, and the second bent portion is bent toward the first face side of the first circuit member.

* * * * *